C. H. STINSON.
CLUTCH MECHANISM.
APPLICATION FILED AUG. 11, 1916.
1,252,050.
Patented Jan. 1, 1918.
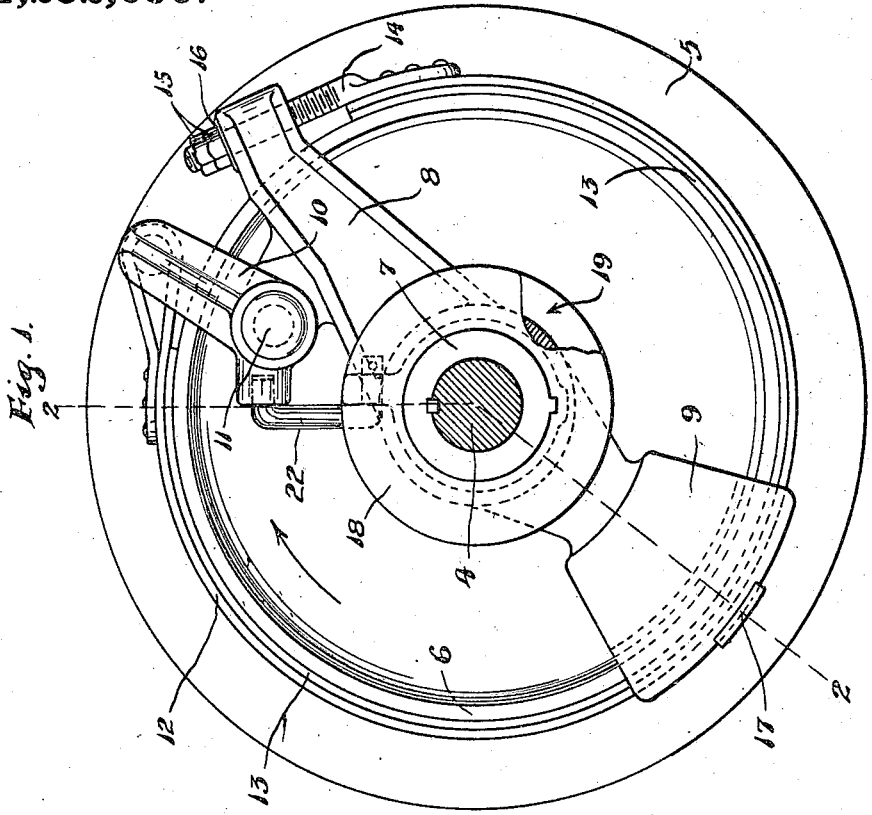
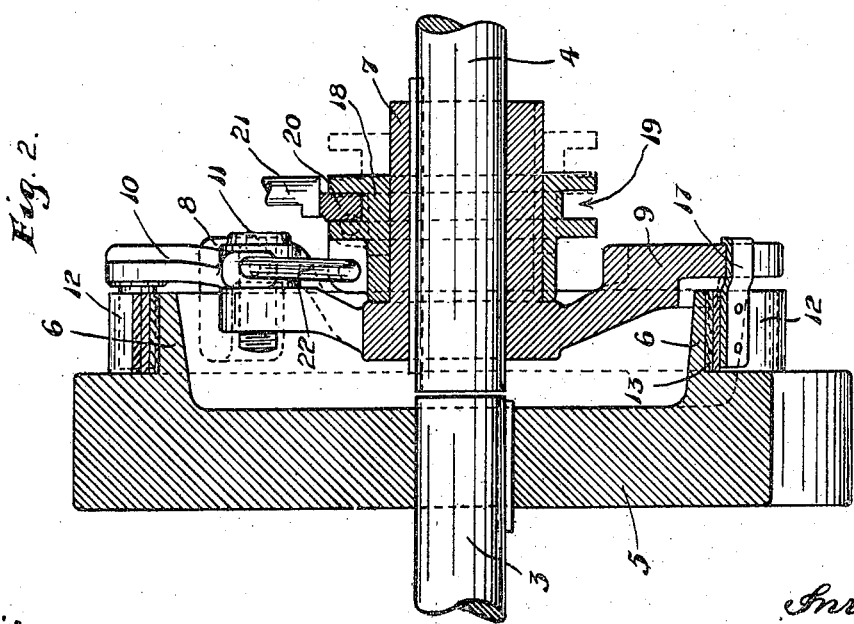
Witnesses
H. L. Opsahl.
E. C. Wells
Inventor
C. H. Stinson
By his Attorneys

UNITED STATES PATENT OFFICE.

CHARLES H. STINSON, OF WATERTOWN, SOUTH DAKOTA.

CLUTCH MECHANISM.

1,252,050.  Specification of Letters Patent.  Patented Jan. 1, 1918.

Application filed August 11, 1916. Serial No. 114,378.

*To all whom it may concern:*

Be it known that I, CHARLES H. STINSON, a citizen of the United States, residing at Watertown, State of South Dakota, have invented certain new and useful Improvements in Clutch Mechanism; and I do hereby declare the following to be a full, clear, and exact description of the invention, such as will enable others skilled in the art to which it appertains to make and use the same.

My invention has for its object to provide an extremely simple and highly efficient friction clutch, or coupling adapted for use to connect two co-axial shafts or rotary members; and to such ends, generally stated, the invention consists of the novel devices and combinations of devices illustrated and defined in the claim.

The improved clutch is illustrated in the accompanying drawings wherein like characters indicate like parts throughout the several views.

Referring to the drawings:

Figure 1 is a side elevation of the improved friction clutch; and

Fig. 2 is a section taken on the line 2—2 of Fig. 1.

The numerals 3 and 4 indicate two axially alined shafts, either of which may be the driving member. However, for the purpose of description, the shaft 3 will be treated as the driving shaft and the shaft 4 as the driven shaft. These shafts may be mounted in any suitable bearings not shown.

Keyed, or otherwise rigidly secured to the driving shaft 3 is a clutch drum shown as in the form of a fly wheel 5 having a laterally projecting annular clutch flange 6.

Keyed, or otherwise rigidly secured to the driven shaft 4 is a hub 7 shown as formed integral with a clutch arm 8 having a diametrically projected segmental counter-weighted end 9. Pivoted to a lug on the arm 8 at 11 is a bell crank lever 10 provided at the end of its outstanding arm with a stud, by means of which it is attached to the looped end of a flexible clutch band 12. This clutch band 12 is preferably of spring metal and is provided with a lining 13 of "raybestos," or other suitable material that works in direct frictional engagement with the exterior of the clutch flange 6. At that end that is opposite to its looped end, the clutch band 12 is provided with a threaded bolt 14 that is passed through a perforation in the end of the clutch arm 8 and is provided at its projecting end with adjusting nuts 15 and preferably also with a segmental washer 16, which latter directly bears against the said arm 8.

To the intermediate outer portion of the clutch band 12 is attached a section spring finger or clip 17, the projecting end of which works loosely on the segmental outer portion of the counter-weighted end 9 of the clutch arm 8.

Keyed to slide upon the hub 7 but to rotate therewith, is a shipper collar 18 that has an annular groove 19. This collar may be shifted laterally even while rotating, by any suitable means, such, for instance, as by the cam projection 20, to an oscillatory rod 21.

The numeral 22 indicates a clutch actuating link, the inner end of which is pivoted to a lug on the sleeve 18 and the outer end of which is laterally bent and loosely pivoted in a seat formed in the relatively short inner arm of the bell crank 10.

When the clutch band 12 is tightly set on the clutch flange 6 the spring finger 17 will yield, as shown in Fig. 2, and permit the intermediate portion of the said band to closely engage the said flange. When, however, the tension on the clutch band is released the said spring finger will retract the intermediate portion of said clutch band. Here it will be noted that the said retracting finger 17 is free to slide or move circumferentially on the segmental outer surface of the counter-weight 9, so that it does not interfere with the endwise movements of the clutch band, nor with the tightening and releasing of the end portions of the said clutch band.

The clutch band is clamped onto the clutch flange by a movement of the shipper sleeve 18 toward the left from its dotted line position, into its full line position, Fig. 2. Here it is important to note that when the clutch is set, as shown by full lines in Fig. 2, the inner end of the link 22 is to the left or inward of its dead center, that is, of a line projected perpendicularly from the axis of the shaft 4 through the pivoted outer end of the said link. This, as is evident, makes the clutch self-locking. Obviously, the clutch band will be released when the collar 18 is moved toward the right or outward to the position indicated by dotted lines in Fig. 2; and here it is important to note that the said link, operating through the bell crank 10, serves to positively release the clutch band, as well as positively to tighten or set the same. Otherwise stated, the said bell crank, through the said link and sleeve is positively moved in both directions. The tension under which the clutch band will be set on the clutch flange, when the link 22 is in its locked position, may, of course, be regulated and fitted at will, by adjustments of the nuts 15 and the bolt 14.

The clutch described is not only simple and of small cost, but highly efficient. As already indicated, the shaft 4 might be the driving shaft and the shaft 3 the driven shaft. When the shaft 3 is the driving shaft, the direction of rotation will be as indicated by the arrow on Fig. 1, whereas, when the shaft 4 is the driving member, the rotation will be in a reverse direction.

What I claim is:

A friction clutch comprising co-axial driving and driven members, an annular clutch surface carried by one of said members, an arm carried by the other member, a lever pivoted to said arm, a clutch band having one end attached to said lever and the other to said arm, a shipper sleeve mounted to slide toward and from said arm, and a link having laterally projected ends, the inner thereof being pivotally seated in said sleeve and thereby held against movement circumferentially of said sleeve, but free for pivotal movements in a plane that intersects said sleeve longitudinally, the said lever having a short projecting arm formed with an open seat in which the outer laterally projecting end of said link is loosely seated.

In testimony whereof I affix my signature in presence of two witnesses.

CHARLES H. STINSON.

Witnesses:
 BERNICE G. WHEELER,
 HARRY D. KILGORE.

Copies of this patent may be obtained for five cents each, by addressing the "Commissioner of Patents, Washington, D. C."